United States Patent [19]

van der Lely et al.

[11] 3,944,002
[45] Mar. 16, 1976

[54] TINE MOUNTINGS

[76] Inventors: Cornelis van der Lely, 7, Bruschenrain, Zug, Switzerland; Ary van der Lely, 10, Weverskade, Maasland, Netherlands

[22] Filed: Feb. 29, 1972

[21] Appl. No.: 230,241

[30] Foreign Application Priority Data

Mar. 1, 1971 Netherlands.................. 7102669

[52] U.S. Cl. .................. 172/763; 172/59; 172/112
[51] Int. Cl.² .......................................... A01B 15/00
[58] Field of Search ........... 172/762, 763, 112, 753, 172/59; 287/20, 20.3, 52, 52.02, 53, 53 SS

[56] References Cited
UNITED STATES PATENTS

| | | | |
|---|---|---|---|
| 1,219,107 | 3/1917 | Jones | 172/763 X |
| 1,335,725 | 4/1920 | Clemens | 172/763 X |
| 2,582,364 | 1/1952 | Tice | 172/112 X |
| 3,090,140 | 5/1963 | Trana | 172/753 X |
| 3,290,918 | 12/1966 | Weasler | 287/53 X |
| 3,657,785 | 4/1972 | Vissers | 172/762 X |

FOREIGN PATENTS OR APPLICATIONS

| | | | |
|---|---|---|---|
| 264,178 | 4/1966 | Austria | 172/763 |
| 1,167,083 | 12/1962 | Germany | 172/762 |
| 1,100,292 | 5/1954 | France | 172/762 |

*Primary Examiner*—Edgar S. Burr
*Assistant Examiner*—R. T. Rader
*Attorney, Agent, or Firm*—Mason, Mason & Albright

[57] ABSTRACT

A tine mounting for a cultivator includes an elongated horizontal support with passages at each end thereof to receive a tine. The passages are enlarged and have securing surfaces at each side thereof to interfit with the fastening portions of tines and prevent same from being displaced.

5 Claims, 10 Drawing Figures

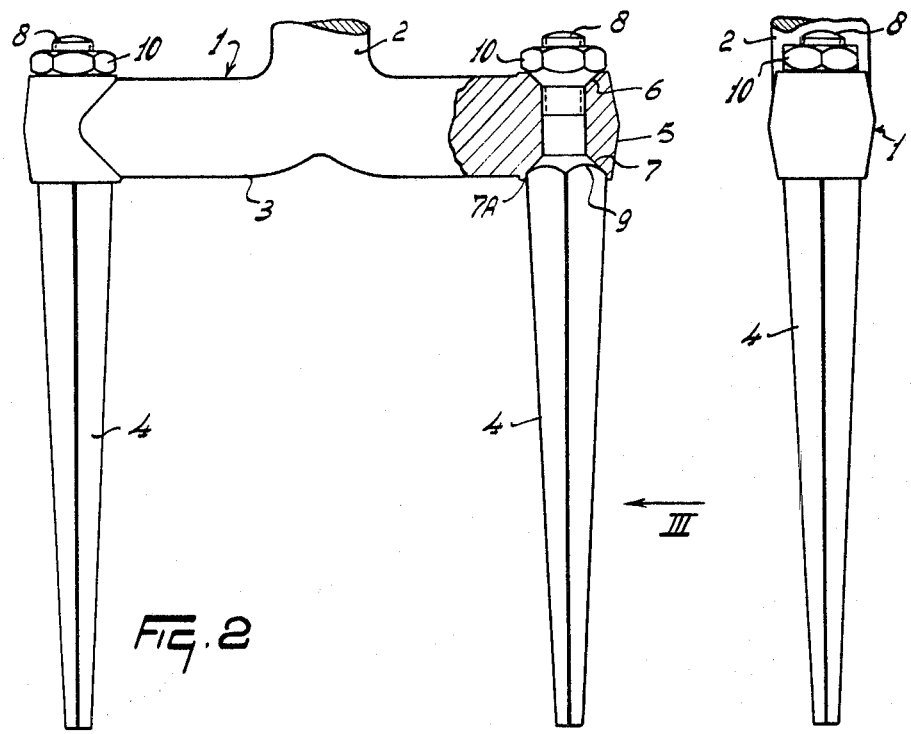
FIG. 2
FIG. 3
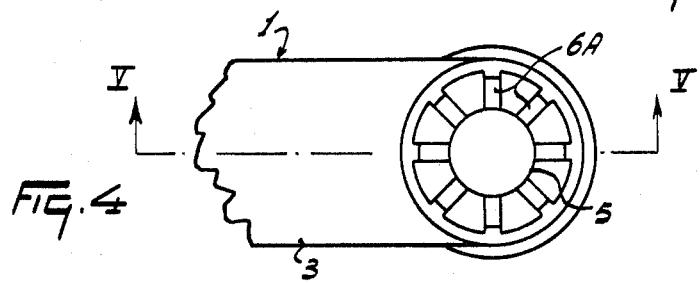
FIG. 4
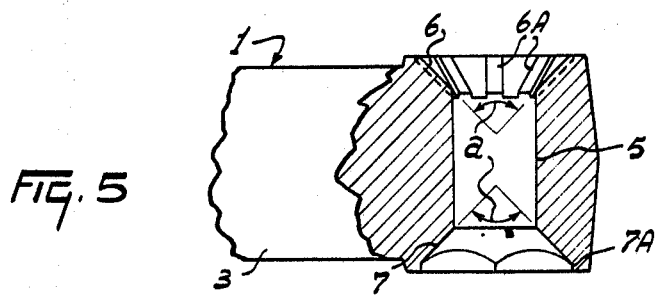
FIG. 5

TINE MOUNTINGS

In accordance with the invention a tine holder is provided which is integral with the support and which tine holder is adapted to receive a fastening portion of a corresponding tine.

Figure 1:
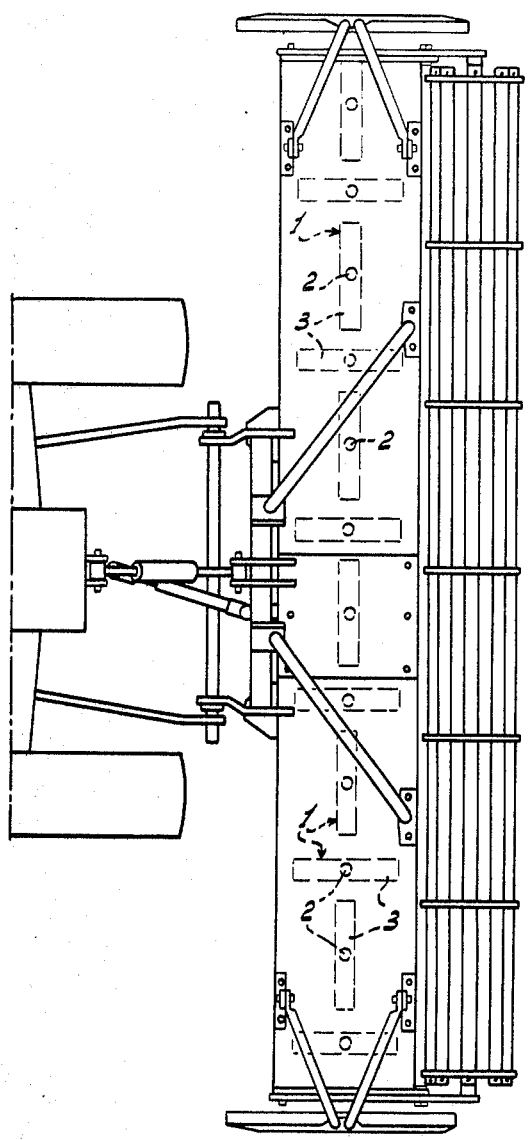

For a better understanding of the invention and to show how the same may be carried into effect, reference will now be made, by way of example, to the accompanying drawings, in which:

FIG. 1 is a plan view of a soil cultivating implement or cultivator whose rotary soil working members have tines that are fastened in position in accordance with the invention, FIG. 2 is a part-sectional elevation to an enlarged scale, showing details of the construction of one of the soil working members of the cultivator of FIG. 1, FIG. 3 is a view as seen in the direction indicated by an arrow III in FIG. 2, FIG. 4 is a scrap plan view illustrating part of an alternative form of soil working member and particularly a tine holder thereof.

Figure 6:
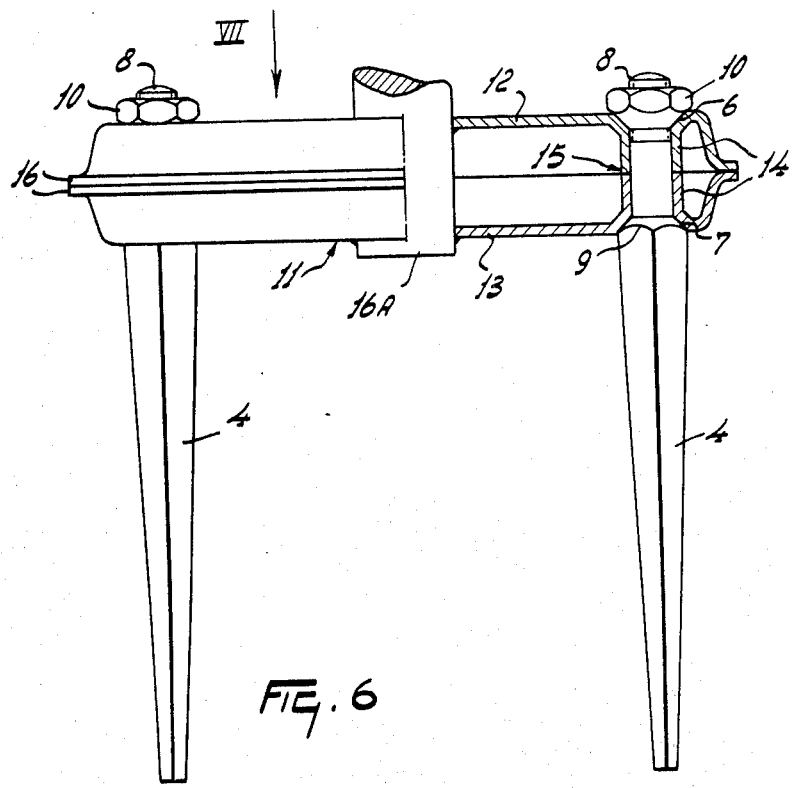
Figure 7:
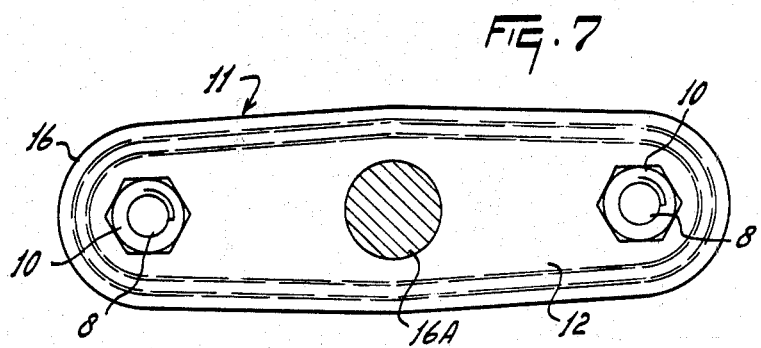
Figure 8:
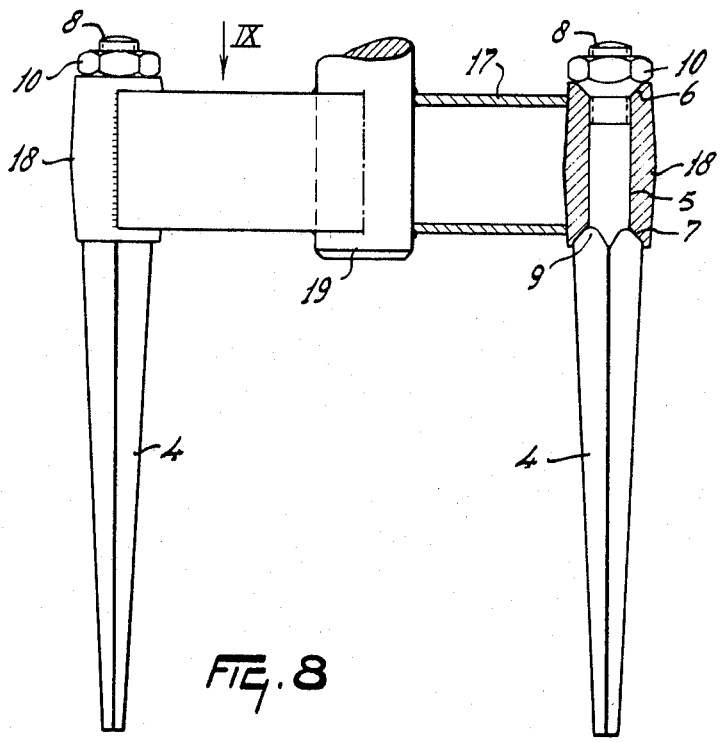
Figure 9:
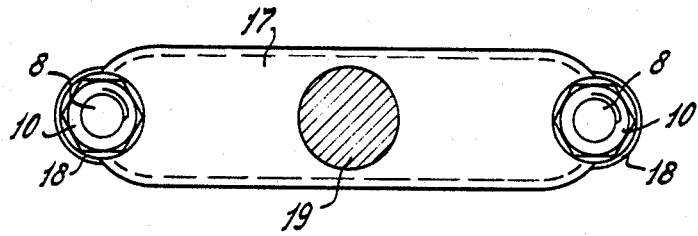

FIG. 5 is a section taken on the line V—V of FIG. 4,

FIG. 6 corresponds to FIG. 2 but shows a further alternative soil working member construction, FIG. 7 is a plan view as seen in the direction indicated by an arrow VII in FIG. 6, FIG. 8 corresponds to FIGS. 2 and 6 and shows a further alternative soil working member construction, FIG. 9 is a plan view as seen in the direction indicated by an arrow IX in FIG. 8.

Figure 10:
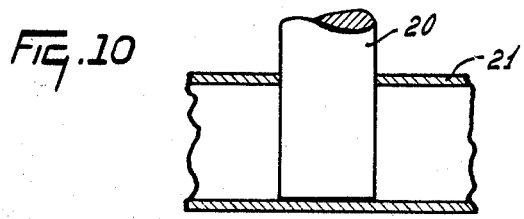

FIG. 10 is a scrap sectional elevation illustrating an alternative way of fastening a tine support to a shaft affording the axes of rotation of a soil working member.

The soil implement or cultivator that is shown in FIG. 1 of the drawings mounted at the rear of an agricultural tractor has a row of twelve soil working members 1 that extends substantially horizontally perpendicular to the intended direction of operative travel of the cultivator which is from right to left as seen in FIG. 1. The soil working members 1 are in neighbouring side by side relationship and each of them is rotatable about an upright axis that is afforded by a corresponding shaft 2 which will normally be vertically or substantially vertically disposed. The lowermost end of each shaft 2 is provided with a corresponding tine support 3 that is substantially horizontally disposed and the opposite ends of which carry a pair of diametrically opposed tines 4.

FIGS. 2 and 3 of the drawings illustrate a tine support 3 carrying tines 4 whose lower soil working portions are of square or other angular cross-section and taper gently but progressively downwards towards their free ends or tips. The illustrated support 3 is forged integrally with the central shaft 2 that affords the axis of rotation of the whole soil working member, the free ends of the substantially horizontal support 3 being provided with substantially vertical cylindrical tine holders 5. The holders 5 are integral with the support 3 and shaft 2 and their longitudinal axes are parallel, or substantially parallel, to the axis of rotation afforded by the shaft 2. The top of each holder 5 is formed with a downwardly tapering conical surface 6 and the bottom thereof is formed with an upwardly tapering conical surface 7. The imaginary apices of the two conical surfaces that have been mentioned are both located inside the corresponding holder 5 and the angle of conicity a (see FIG. 5) is preferably, in each case, substantially 90°. The lower conical surface 7 is surrounded, at its mouth, by four relatively inclined flats 7A while the upper conical surface 6 is formed with eight recesses 6A that are equally spaced apart from one another around the longitudinal axis of the holder 5 in the manner which can be seen best in FIG. 4 of the drawings. Each holder 5 should have a vertical length of not less than 50 millemeters and it is preferred that its magnitude should be substantially 60 millimeters. Each tine 4 is formed with a fastening collar 9 of conical curvature that will co-operate with a corresponding one of the conical surfaces 7. The tine 4 is prevented from turning in its holder 5 by virtue of the co-operation of flat portions of the angular profile of the soil working portion of the tine that are located immediately beneath the collar 9 with the flats 7A of the tine holder 5. Each tine 4 has a screw-threaded portion 8 at its upper end which portion projects a short distance above the corresponding holder 5 when the tine 4 is in its appointed position. A nut 10 having a downwardly directed conical surface co-operates with the screw-threaded portion 8 of the tine, said conical surface abutting against the conical surface 6 of the tine holder. The edges of the eight recesses 6A bear against the conical surface of the nut 10 when it is tightened and act to tend to prevent said nut from working loose.

FIGS. 6 and 7 of the drawings illustrate a tine support 11 formed from two portions 12 and 13 of metallic sheet material. These portions 12 and 13 are profiled by punching and each of them defines, at each end, a corresponding portion 14 of a cylindrical tine holder 15. The upper portion 12 and lower portion 13 of the support 11 have abutting substantially horizontal edges 16 which are fastened to one another, for example, by welding. The holders 15 comprise upper conical surfaces 6 and lower conical surfaces 7 that are arranged to co-operate with the same tines 4 and their fastening nuts 10 that have already been described. However, in this case, a shaft 16A which affords the axis of rotation of the whole soil working member is entered through holes in the upper and lower portions 12 and 13 of the support 11 and is secured to the margins of those holes by welding.

FIGS. 8 and 9 of the drawings illustrate a construction in which substantially vertically disposed cylindrical tine holders 18 are welded or otherwise secured to the opposite ends of a hollow support 17. Each holder 18 has an axial length which is not less than 50 millimeters and which it is preferred should be substantially 60 millimeters. The longitudinal axes of the two holders are substantially parallel to the axis of rotation which is afforded by a central shaft 19 which is again entered through holes in the support 17 and welded to the margins of those holes. It will be seen from the drawings that the upper and lower ends of the holders 18 are provided with conical surfaces 6 and 7 that correspond to those which have already been described and that said holders are arranged to receive tines 4 that are generally similar to those that have already been described with reference to FIGS. 2 and 3 of the drawings.

FIG. 10 of the drawings shows a modification of the tine support construction of FIGS. 8 and 9 in which a hole is formed only in an uppermost region of the support 2 and a central shaft 20 affording the axis of rotation of the soil working member is rigidly secured to a lowermost region of the support 21, internally of the latter, by stud welding. It will be noted from the drawings that, in all of the embodiments that have been described with reference to FIGS. 2 to 10, the upper fastening portion of each tine 4 just fits in its co-operating holder with only a minimum of clearance sufficient to allow relative movement solely during installation and removal. With the afore described structure a simple and still reliable tine mounting is achieved.

While various features of the tine fastenings and tine support fastenings that have been described and/or that are illustrated in the accompanying drawings will be set forth in the appended claims as inventive features, it is to be noted that the invention is not limited to those features and that it encompasses all of the parts that have been described and/or illustrated both individually and in various combinations.

What we claim is:

1. A cultivator comprising a frame and a plurality of soil-working members mounted on said frame for rotation about upwardly extending axes, each soil-working member being a substantially vertical shaft with an elongated, substantially horizontal tine support at the lower end of said shaft, said support having opposite ends with cylindrical tine holders in the form of substantially vertical passageways that extend through the support, the top of each passageway being formed with a downwardly tapering conical surface and the bottom of the passageway being formed with an upwardly tapering conical surface, said passageway holding a fastening portion of a tine and said fastening portion extending through the passageway and being secured to said support, said tine having a multi-sided soil-working portion which is received by cooperating surfaces of said upwardly tapering conical surface to resist the angular displacement of the tine and said upwardly tapering conical surface comprising flats that interfit with flat portions of said tine.

2. A cultivator as claimed in claim 1, wherein the fastening portion of the tine is threaded and secured with a nut having tapering surfaces that interfit with said downwardly tapering conical surface, a fastening collar of conical curvature on said tine being located above said flat portions, said collar being received in said upwardly tapering conical surface above said flats.

3. A cultivator as claimed in claim 2, wherein each conical surface has an imaginary apex located internally of said holder.

4. A cultivator as claimed in claim 3, wherein the angle of conicity of each conical surface is substantially 90°.

5. A cultivator as claimed in claim 4, wherein said downwardly extending conical surface has spaced apart recesses with edges that bear against the tapering surfaces of said nut to prevent same from working loose.

* * * * *